United States Patent

[11] 3,553,363

[72] Inventor Arthur E. Anderson
Pittsburgh, Pa.
[21] Appl. No. 787,881
[22] Filed Dec. 30, 1968
[45] Patented Jan. 5, 1971
[73] Assignee Westinghouse Electric Corporation
Pittsburgh, Pa.
a corporation of Pennsylvania

[54] POWER SUPPLY FOR CAMERA SYSTEM INCLUDING IMAGE INTENSIFIER
8 Claims, 1 Drawing Fig.

[52] U.S. Cl. .......... 178/7.2
[51] Int. Cl. .......... H04n 3/18, H04n 3/20
[50] Field of Search .......... 178/6P.S., 7.2E; 315/(Inquired)

[56] References Cited
UNITED STATES PATENTS

| | | | |
|---|---|---|---|
| 2,362,358 | 11/1944 | Daly | 178/6(PS) |
| 2,637,011 | 4/1953 | Schwarz | 178/6(PS) |
| 3,206,547 | 9/1965 | Leitich et al. | 178/7.2(E) |
| 3,315,034 | 4/1967 | White | 178/7.2(E) |
| 3,445,590 | 5/1969 | Dischert et al. | 178/7.2(E) |

*Primary Examiner*—Richard Murray
*Attorneys*—F. H. Henson, C. F. Renz and A. S. Oddi

ABSTRACT: A high voltage power supply for use in a camera system operative with an image intensifier is disclosed wherein the primary of a transformer is energized in response to a voltage derived by horizontal scanning signals, a gain control voltage proportional to the video output of the camera signal and vertical retrace signals so that a high voltage is induced at the secondary of the transformer during only the retrace portion of the vertical scanning signals which has a magnitude proportional to the gain control voltage with this high voltage being translated to the image intensifier.

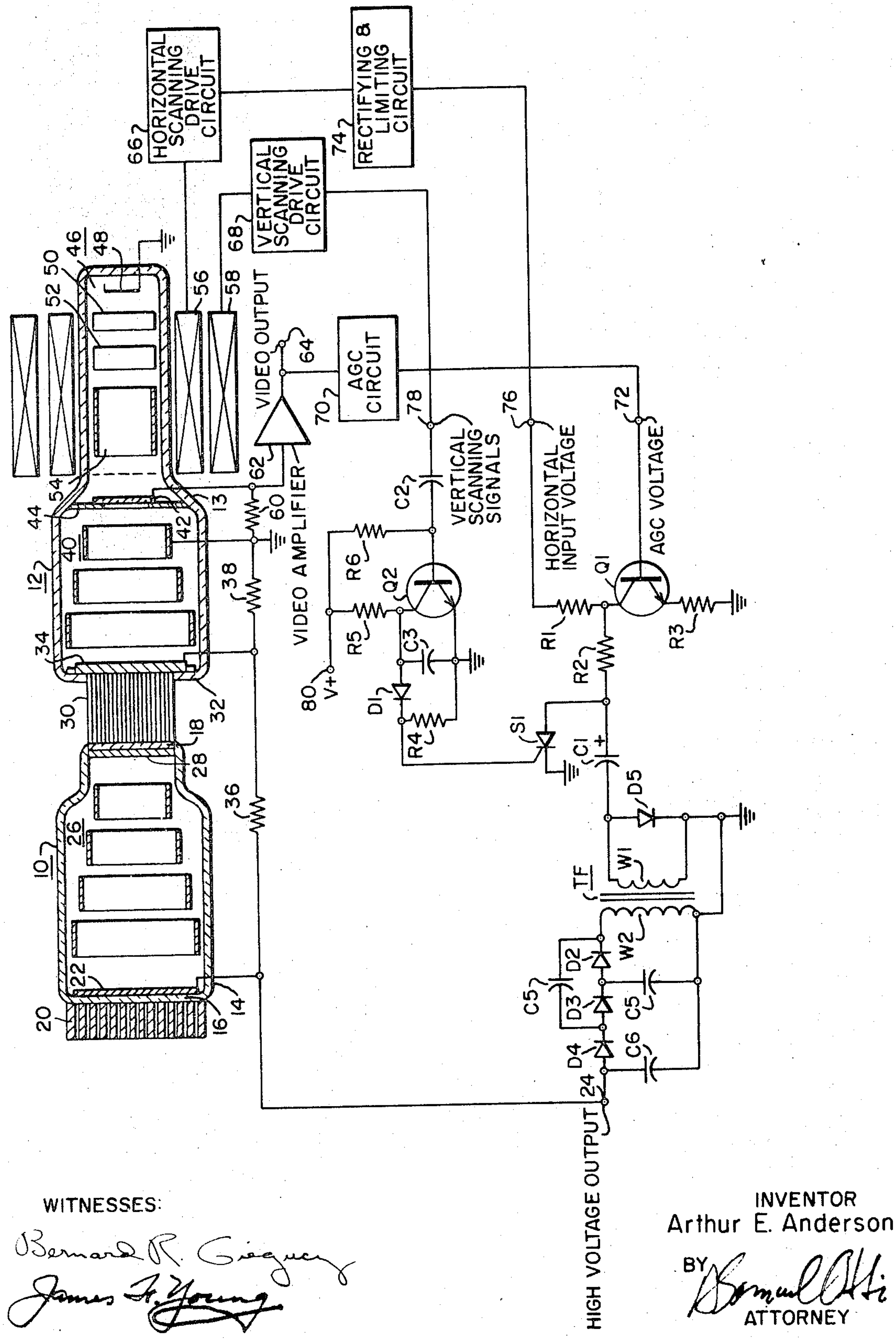
WITNESSES:
Bernard R. Gieguez
James F. Young
INVENTOR
Arthur E. Anderson
BY Samuel Otti
ATTORNEY

POWER SUPPLY FOR CAMERA SYSTEM INCLUDING IMAGE INTENSIFIER

BACKGROUND OF THE INVENTION

1. Field of the Invention

The present invention relates to high voltage power supplies and, more particularly, to such power supplies for use in camera systems employing image intensifiers.

2. Discussion of the Prior Art

Image intensifiers optically coupled via fiber optics to a television camera have proven highly effective for increasing the sensitivity of the television camera. Because of the wide bandwidth required for the sensitive video amplifiers which are utilized to amplify the electrical output signal of the camera tube, the camera system is unusually susceptible to external noise. Even with extensive shielding from spurious radiation it is not always possible to eliminate interfering signals radiated from strong external sources which fall within the pass band of the camera system. The image intensifier which is intimately coupled to the front end of the camera tube requires a high voltage in the order of 20—30,000 volts for its operation. Thus special care must be taken to minimize the effects of such a high voltage on the video output of the camera tube. Particularly, consider effort must be taken to filter the AC ripple which may appear on the high voltage even though the image intensifier itself may not be sensitive to this ripple. Prior art power supplies for supplying the high voltage requirements of an image intensifier optically coupled to a camera tube have not effectively solved the problem of interference in the pass band of the camera system. In power supplies which are continuously driven by a 60 Hz. or higher frequency source, a serious problem is introduced in that the high voltage is generated during the active scan period of the television camera. Thus any interference caused by the generation of the high voltage will be impressed upon the desired video output signals. The use of a power supply system which generates the high voltage in response to horizontal retrace pulse also introduces interference and provides less than satisfactory performance in that such horizontal retrace pulses are of a short time duration and the undamped oscillation thereof causes ringing distortion at the left edge of the picture at the start of the next horizontal line of scan. Moreover power supplies of the type driven by the horizontal retrace pulses have an output voltage which may vary over relatively wide ranges necessitating the use of high voltage regulators adding to the complexity and expense of the power supply.

In camera systems it is highly desirable to remove the high voltage from the image intensifiers of the camera system in case a failure of horizontal or vertical scan should occur. If the high voltages are not removed in case of scan failure this could be damaging to the camera tube in that the electron beam would be concentrated on the target of the tube rather than being properly scanned. In a continuous type of power supply for generating the high voltage, the camera tube would be susceptible to both horizontal and vertical scan failure. In the horizontal retrace pulse type of power supply, damage to the camera tube may result from the failure of the vertical scan since the high voltage would still be developed in response to the horizontal scanning process. It would thus be highly desirable if a power supply could be provided which is fail-safe against both horizontal and vertical scan failure.

SUMMARY OF THE INVENTION

The present invention relates to a camera system operative with an image intensifier wherein a high voltage for use by the image intensifier is developed during the vertical retrace portion of the vertical scanning cycle in response to a voltage provided by horizontal scanning signals and proportional to the video output of the camera system.

BRIEF DESCRIPTION OF THE DRAWING

The single FIG. is a schematic-block diagram of a camera system utilizing an image amplifier and including a high voltage power supply according to the teachings of the present invention.

DESCRIPTION OF THE PREFERRED EMBODIMENT

Referring to the FIG. a camera system is shown including an image amplifier tube 10 and an electron image camera tube 12 operatively coupled together with a high voltage power supply provided for supplying the high voltage required for the operation of the image intensifier tube 10 and camera tube 12 will be provided herein for the purpose of illustrating a desirable use for the power supply of the present invention. It should be understood however that the specific details of the camera system are not controlling in the usage of the power supply to be described but various other types of image amplifiers and camera tubes can be utilized with the present high voltage power supply.

The image amplifier tube 10 includes an envelope 14 having an input end 16 of a larger diameter than its output end 18. A fiber optics member 20 is disposed adjacent the input end 16 for translating light thereto from light image to be scanned. The light passes through the fiber optic member 20 and the end 16 of the tube 10 and is applied to a photocathode 22 which receives the light image and converts it to an electron image. A high voltage is applied to the photocathode 22 via a high voltage terminal 24. This high voltage may be in the order of −24,000 volts DC as developed in the power supply of the present invention to be described hereinafter. The electron image supplied by the photocathode 22 is accelerated and focused by an electrostatic lens system 26 which includes a plurality of electrodes having decreasing diameters from the input end 16 to the output end 18 of the image intensifier tube 10. Suitable potentials are applied to the various electrodes of the electrostatic lens system 26 as well known in the art. The accelerated and focused electron image is applied to a light emissive layer 28 which is disposed on the inside of the tube 10 adjacent the output end 18 thereof. The light emissive layer in response to the electron image converts the image to a light image corresponding to the original light image applied to the fiber optics member 22, however, at an increased intensity due to the operation of the light intensifier tube 10. The intensified light image on the light emissive layer 28 is applied through the output end 18 of the image intensifier tube 10. The intensified light image on the light emissive layer 28 is applied through the output end 18 of the image intensifier tube 10 through a fiber optics member 30. The fiber optics member 30 is coupled between the output end 18 of the image intensifier tube 10 and the input end of the camera tube 12 with the fiber optics member 30 being sealed by a face plate 32 of the camera tube 12 and applying its light image to a photocathode 34 disposed immediately behind the face plate 32. A suitable high voltage is applied to the photocathode 34 which may be developed by dividing down the high voltage supplied at the high voltage terminal 24 via a voltage divider network including a resistor 36 and a resistor 38 connected between the high voltage terminal 24 and ground with the junction point between resistors 38 and 36 being connected to the photocathode 34. The voltage applied to the photocathode 34 may be in the order of 7,000 volts to 8,000 volts DC The photocathode 34 converts the light image applied thereto to an image which is accelerated and focused via an electrostatic lens system 40 which includes a plurality of electrodes of decreasing diameter away from the photocathode 34 with the last electrode being grounded. The target element 42 is provided within the camera tube 12 which is supported by a support ring 44. The support ring 44 has an aperture therein so that the electron image focused and accelerated by the electrostatic lens system 40 is applied to the target member 42. Disposed on the other side of the target member 42 is an electron gun 46 which includes an electron emitting cathode 48, which is grounded, a control grid electrode 50 and an accelerating grid electrode 52. The electron gun 46 under the control of the electrodes 50, 52 and 54 provides an electron beam which is suitable for application to the target element 42. A horizontal deflection coil 56 and a vertical deflection coil 58 are disposed about the envelope 13 of the camera tube 12 so as to electromagnetically provide for the horizontal and vertical scanning of the electron beam provided by the electron gun 46 for the target element 42.

The target element 42 has the characteristic of providing an electron flow therefrom in response to the electron beam from the electron gun 46 being applied thereto. This electron output is proportional to the electron image applied to the side opposite to the electron bombardment from the gun 46. The electron output from the target element 42 in the form of current is applied to a load resistor 60 which is connected between the target element 42 and ground. The voltage output developed across the resistor 60 is applied to a video amplifier 62 for amplification therein to supply a video output at a video output terminal 64.

A horizontal scanning drive circuit 66 is provided for supplying the necessary horizontal waveform to the horizontal deflection coil 56. A vertical scanning drive circuit 68 is employed for supplying the vertical sawtooth waveform to the vertical deflection coil 58. In response to the output of the horizontal scanning drive circuit 66, the electron beam from the electron gun 46 is scanned in a horizontal direction from left to right across the target member 42 and in response to this electron bombardment the target element 42 supplies a current output in proportion to the electron image input at the line scanned to the other side thereon supplied from the photocathode 34. The vertical scanning drive circuit 68 activates the vertical deflection coil 58 so that the electron beam from the electron gun 46 is scanned in a vertical direction down the target member 42 with the electron beam being retraced to the top of the target member 42 at the end of a vertical scanning period. The vertical scanning and horizontal scanning drive circuits 68 and 66 respectively are well known in the art for supplying the standard sawtooth scanning currents for the horizontal and vertical deflection coils 56 and 58.

The camera tube 12 described herein may comprise any standard camera tube for example of the image orthacon, vidicon or secondary electron conduction (SEC) types which are well known in the art. The above description of the image intensifier 10 and the camera tube 12 have been given only as background information and may comprise any well known types of such tubes presently available on the market.

The circuitry and method of developing the high voltage for application to the high voltage terminal 24 will now be described. The power supply circuit of the present invention utilizes three inputs which are derived, respectively, from the video output 64, the horizontal scanning drive circuit 66 and the vertical scanning drive circuit 68. The video output 64 comprises a standard video waveform whose amplitude varies in correspondence to the light image being scanned at a given instant of time and is thus an amplitude modulated signal. The video output is applied to an automatic gain control circuit 70, which may comprise any of the well known types of automatic gain control (AGC) circuits. The output of the AGC circuit 70 is developed at a terminal 72 and is a direct voltage corresponding to the amplitude of the video output. The AGC voltage at the terminal 72 is thus a measure of the amplitude of the video output 64 and may be utilized in a feedback manner for controlling the video output level within defined limits which is highly desirable for the effective utilization of the video output at the terminal 64.

The horizontal scanning drive 66 supplies an output, which is the standard horizontal sawtooth waveform of the horizontal scanning frequency of, for example, 15,750 Hz., which is applied to a rectifying and limiting circuit 74. The function of the rectifying and limiting circuit 74 is to convert the horizontal waveform to a unidirectional waveform, for example, of the positive polarity and to limit this output to a predetermined voltage of, for example, +300 volts. The output of the rectifying and limiting circuit 74 defines a horizontal input voltage and is supplied at a terminal 76. The horizontal input voltage comprises a direct voltage of a value of for example +300 volts.

The vertical scanning drive circuit 68 supplies vertical scanning signals at a terminal 78 corresponding to the standard vertical sawtooth applied to the vertical deflection coil 58. The sawtooth is at a frequency of the vertical scanning rate which, for example, may be 60 Hz.

The horizontal input voltage at the terminal 76 is applied via a resistor R1 and a resistor R2 to charge a capacitor C1 to a polarity as indicated on the drawing. A controlled switching device S1, which may comprise a silicon controlled rectifier (SCR), has its anode connected between the junction of the resistor R2 and the capacitor C1 and ground. The other end of the capacitor C1 is connected to ground via the primary winding W1 of a high voltage transformer TF. The controlled switching device S1 is normally nonconductive during the entire vertical scanning period for a field of scan and is turned on only during the vertical retrace portion of the scanning cycle as will be explained below. A transistor Q1 is provided which has its collector electrode connected to the junction of the resistors R1 and R2 and its emitter electrode connected via a resistor R3 to ground. The AGC voltage from the terminal 42 is applied to the base of the transistor Q1 and thereby controls the conductivity thereof. The voltage to which the capacitor C1 is charged is determined by the conductivity of the transistor Q1. When the ABC voltage at the base of the transistor Q1 is a low value, indicating a low video output level at the terminal 72, the conductivity of the transistor Q1 will also be low and therefore the voltage appearing at the collector of the transistor Q1 will be high. Thus, the lower the AGC voltage applied to the base of the transistor Q1 the more closely will the capacitor C1 charge to the magnitude of the horizontal input voltage appearing at the terminal 76. As the AGC voltage at the base of transistor Q1 increases, indicating an increase in the video output at terminal 72, the transistor Q1 becomes more conductive causing the collector voltage thereof to decrease. Thus the capacitor C1 will charge to a lower voltage as the AGC voltage goes up. By making the magnitude of the voltage to which the capacitor C1 charges inversely proportional to the AGC voltage, feedback control is provided from the high voltage output of the power supply as will be discussed below.

The vertical scanning signals from the terminal 78 are AC coupled via a capacitor C3 to the base of a transistor Q2. The transistor Q2 is normally fully conductive being so biased from a direct operating potential V+ applied at a terminal 80 via a resistor R5 connected to the collector electrode and a resistor R6 connected to the base of the transistor Q2. The emitter of the transistor Q2 is connected to ground. Therefore, during the vertical scanning interval, the transistor Q2 is conductive so that the collector thereof is substantially held at ground level. A capacitor C3 is connected between the collector of transistor Q2 and ground. A diode D1 is connected from anode to cathode between the collector electrode of the transistor Q2 and the gate electrode of the controlled switching device S1. A resistor R4 is connected between the gate of the controlled switching device S1 and ground for developing a gating voltage thereacross.

With the transistor Q2 conductive during the vertical scanning period, the anode of the diode D1 is essentially held at ground potential and therefore no gating signal is translated therethrough to the gate of the controlled switching device S1. At the vertical retrace interval of the vertical scanning signal when the vertical scanning signal goes from its peak positive excursion to its peak negative excursion in a short period of time the transistor Q2 is suddenly turned off by rendering its base electrode negative with respect to its emitter electrode. Therefore, the collector voltage suddenly rises from its ground potential toward the V+ potential causing the diode D1 to be forward biased providing a current flow therethrough to supply a gating voltage to the gate of the controlled rectifier S1. The controlled switch S1 is thus rendered conductive with the gate being made positive with respect to the cathode electrode thereof. The controlled rectifier S1 is thus turned on at this instant of time which is during the vertical retrace portion of the vertical scanning cycle. The function of the capacitor C3 connected between the collector of the transistor Q2 and ground is to eliminate any spurious signals which might be translated to the transistor Q2 of a higher frequency, for example from the horizontal scanning circuit, which might cause a false gating signal to be applied to the controlled rectifier S1.

With the turning on of the controlled switching device S1, the capacitor C1, which had previously charged to a positive polarity at the side indicated is discharged through the anode-cathode circuit of the controlled switch S1, the primary winding W1 of the high voltage TF to the other side of the capacitor C1. In response to the sudden energization of the primary winding W1 by the discharge of capacitor C1 therethrough, a high voltage is induced in the secondary winding W2 of the transformer TF. A diode D5 is connected across the primary winding, with the anode thereof connected to the top end of the winding W1 and the cathode being grounded. The diode D5 thus prevents ringing of the winding W1 with the capacitor C1 and insures the rapid unidirectional discharge of the capacitor C1 through the winding W1. The bottom end of the secondary winding W2 is grounded and the top end is connected to a voltage multiplier circuit which in the present example comprises a voltage tripler circuit. The voltage tripler circuit as shown comprises a standard configuration which includes three diodes D2, D3, D4 connected in series between the top end of the secondary winding W2 and the output terminal 24 of the power supply, which comprises the high voltage output of the power supply supplied to the photocathode 22 of the image intensifier 10. The diodes D2, D3, and D4 are poled from anode to cathode between the terminal 24 and the top end of the transformer W2 so that a negative potential with respect to ground is developed at the terminal 24. A capacitor C4 is connected between the anode-cathode junction of the diodes D2 and D3 to ground and capacitor C5 is connected between the anode-cathode junction of the diodes D3–D4 and the top end of the transformer secondary winding W2. A capacitor C6 is connected between the high voltage terminal 24 and ground to complete the voltage tripler circuit.

Thus, with the sudden discharge of the capacitor C1 through the controlled switching device S1 when the controlled switching device S1 is gated on during the vertical retrace portion of the vertical scanning cycle, the primary winding W1 is energized in accordance with the magnitude of the voltage stored on the capacitor C1 which as previously explained is inversely proportional to the AGC voltage developed at the terminal 72 of the AGC circuit 70. Hence, if an AGC voltage 72 is low due to lower than desired video output from the camera system appearing at the terminal 64, the capacitor C1 will be charged to a relatively higher voltage during the vertical scanning period of the vertical scanning cycle. At the retrace portion of the vertical scanning cycle this relatively high voltage is discharged through the controlled switching device S1 and primary winding W1 to induce a high voltage at the secondary winding W2. This voltage would be accordingly increased due to the higher voltage on the capacitor C1. This high voltage is multiplied in the voltage tripler with an increased high voltage output appearing at the terminal 24 to be applied to the photocathode 22 of the image intensifier 10 thereby increasing the intensification thereof and causing the video output of the camera system at the terminal 24 to be increased. If on the other hand the AGC voltage in response to the video output at the terminal 64 would be of a higher value than desired, the capacitor C1 would be charged to a lower voltage which would cause a lower voltage to be induced at the secondary winding W2 of the high transformer TF and cause the ultimate high voltage at the terminal 24 to be lower thereby decreasing intensification of the image intensifier 10 and the overall video output of the camera system. It can thus be readily seen that the high voltage output at the terminal 24 is controlled in accordance with the AGC voltage developed in response to the video output 64 of the camera system.

Additional advantages of the present power supply can also be seen in that fail-safe operation is provided if either the vertical or horizontal scanning drive circuits 66 or 68 should fail. In the case of failure of either of these, the high voltage output at the terminal 24 is not generated thereby removing the high voltage from the camera system. If, for example, the horizontal scanning drive circuit 66 should fail, the horizontal input voltage at the terminal 78 at the output of the rectifier and limiting circuit 74 would not be provided. Therefore no charging voltage would be supplied to the capacitor C1 and, thus, when the controlled switching device S1 is gated on during the vertical retrace time, the primary winding W1 would not be energized in that the capacitor C1 had not previously been charged. Thus no high voltage output would be generated at the terminal 24. On the other hand, if the vertical scanning drive circuit 68 should fail to supply vertical scanning signals, no gating pulses would be supplied during the vertical retrace time to the gate of the controlled switching device S1 and therefore capacitor C1 once charged would remain charged and would not be discharged through the primary W1 of the transformer TF and hence ultimately no high voltage output at the terminal 24 would be developed.

Several primary advantages of the present power supply are derived from the fact that the high voltage output is generated only during the vertical retrace portion of the vertical scanning cycle. Thus the highly sensitive wide band video amplifier 62 is not subjected to interference due to the generation of the high voltage during the active scan periods of the camera system. Thus any interference due to the fluctuations or generations of the high voltage output are eliminated from being translated by the video amplifier to appear in the video output, therefore providing a highly improved signal-to-noise ratio over previous power supply systems. Additionally, by generating the high voltage in response to the vertical retrace portion of the vertical scanning cycle, the problem of ringing at the left edge of the picture as generally associated with horizontal retrace pulse driven power supplies has been eliminated in that the vertical retrace time is substantially longer than that of the horizontal retrace time, therefore, permitting the oscillations of the vertical retrace pulse to be completely attenuated without affecting the video output of the camera system. Also in the present invention the high voltage output is generated independently of the magnitude of either the vertical scanning signals or the horizontal scanning signals. The vertical scanning signals are utilized merely for triggering the controlled switching device S1 during the retrace portions thereof and the horizontal scanning signals are rectified and limited to eliminate any dependence of the DC output on the magnitude thereof which is fixed at a predetermined value. The magnitude of the high voltage, however, is controlled by the AGC voltage as previously explained. By providing a high voltage output independent of the amplitude of the horizontal or vertical scanning signals, the need for high voltage regulation through the use of regulating tubes or other circuitry is eliminated.

Although the present invention has been described with a certain degree of particularity, it should be understood that the present disclosure has been made only be way of example and that numerous changes in the details of construction and the combination and arrangement of parts, elements and components can be resorted to without departing from the spirit and scope of the present invention.

I claim:

1. In a camera system operative with an image intensifier including means for developing horizontal scanning signals and means for developing vertical scanning signals, the combination of:

means for developing a gain control voltage in response to the video output of said camera system;

means for developing a horizontal input voltage in response to said horizontal scanning signals;

means for developing vertical retrace signals in response to the vertical retrace portion of said vertical scanning signals;

transforming means including a low voltage primary and a high voltage secondary;

means for energizing said primary in response to said horizontal input voltage, said gain control voltage and said vertical retrace signals so that a high voltage is induced at said secondary during the retrace portion of said vertical scanning signals of a magnitude proportional to said gain control voltage; and means for translating said high voltage to said image intensifier.

2. The combination of claim 1 wherein said means for energizations includes:

storage means for storing an energizing voltage proportional to said gain control voltage; and switching means for applying said energizing voltage to said primary in response to said vertical retrace signals.

3. The combination of claim 2 wherein said means for energizing includes a control device for receiving said horizontal input voltage and said gain control voltage and being operatively connected to said storage means for controlling the magnitude of said energizing voltage in response to the magnitude of said gain control voltage.

4. The combination of claim 3 wherein said means for developing vertical retrace signals includes a device responsive to said vertical scanning signals for developing said vertical retrace signals for application to said switching means.

5. The combination of claim 4 wherein:

said storage means comprises a capacitor;

said switching means comprises a controlled switching device; and said capacitor, said control switching device and said primary being operating connected in series.

6. The combination of claim 5 includes a rectifying device operatively connected across said primary to prevent the ringing thereof when energized.

7. The combination of claim 1 wherein said means for translating includes a voltage multiplying circuit for multiplying said high voltage by a predetermined factor for application to said image intensifier.

8. The combination of claim 5 wherein said camera system includes several stages of image intensifiers and wherein:

said voltage multiplier circuit for multiplying said high voltage by a predetermined factor; and said combination includes means for applying predetermined portions of multiplied high voltage to respective stages of said image intensifiers.